US008745129B2

(12) United States Patent
Wong et al.

(10) Patent No.: US 8,745,129 B2
(45) Date of Patent: Jun. 3, 2014

(54) CLIENT WITH STANDBY SERVER CONNECTION FUNCTION AND METHOD THEREOF

(75) Inventors: Shih-Fang Wong, New Taipei (TW); Xin Lu, Shenzhen (CN); Peng Tang, Shenzhen (CN); Jia-Hong Yang, Shenzhen (CN); Hui-Feng Liu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 295 days.

(21) Appl. No.: 13/155,393

(22) Filed: Jun. 8, 2011

(65) Prior Publication Data
US 2012/0173611 A1    Jul. 5, 2012

(30) Foreign Application Priority Data
Dec. 31, 2010    (CN) .......................... 2010 1 0619589

(51) Int. Cl.
G06F 15/16    (2006.01)
(52) U.S. Cl.
USPC .............................. 709/203; 714/4.1; 714/10

(58) Field of Classification Search
USPC ............ 714/4.1, 4.11, 10; 709/223, 208, 227, 709/248; 379/27.01
See application file for complete search history.

(56) References Cited

U.S. PATENT DOCUMENTS

| 5,948,108 | A  | * | 9/1999  | Lu et al. .......................... 714/4.1 |
| 6,560,717 | B1 | * | 5/2003  | Scott et al. ....................... 714/4.1 |
| 7,185,111 | B2 | * | 2/2007  | Fulghum et al. ............... 709/248 |
| 8,010,830 | B2 | * | 8/2011  | Hotta et al. ................... 714/4.11 |
| 8,065,559 | B2 | * | 11/2011 | Kamath et al. ................... 714/10 |
| 2003/0172145 | A1 | * | 9/2003 | Nguyen ........................ 709/223 |
| 2012/0128135 | A1 | * | 5/2012 | Sun ............................. 379/27.01 |

* cited by examiner

Primary Examiner — Dustin Nguyen
(74) Attorney, Agent, or Firm — Novak Druce Connolly Bove + Quigg LLP

(57) ABSTRACT

A process giving a client the capability of fixing the time within which it may attempt to connect itself to a standby server and a method thereof are provided. The client records the length of time preceding every successful-connection to at least one standby server within a predetermined period, determines an average connection setup time relating to the at least one standby server calculated from all the recorded connection setup times, detects in real time whether the client is successfully connected to a master server, and switches the connection attempts of the client away to each standby server in turn, according to the average connection setup time applying to each standby server respectively, once the client has lost its connection with the master server.

9 Claims, 3 Drawing Sheets

CLIENT WITH STANDBY SERVER CONNECTION FUNCTION AND METHOD THEREOF

BACKGROUND

1. Technical Field

The present disclosure relates to clients and, more particularly, to a client capable of controlling the duration of time in which it attempts to connect itself to a standby server and a method thereof.

2. Description of Related Art

A client-server system often includes a master server and at least one standby server. When a client loses its connection to the master server, the client will attempt to connect itself to a standby server. Usually, the duration of time allowed for the client to attempt to connect itself to a standby server is preset by users, but this preset time may be too long or too short. If the time is too long, that amount of time is wasted if the standby server is in sleep mode or other abnormal states. If the time is too short, it may prevent a successful connection even if the standby server is operating normally.

It is desirable to provide a client with the capability of controlling the duration of time within which it may attempt to connect itself to a standby server and a method thereof to solve the problems mentioned above.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation. It should be noted that references to "an" or "one" embodiment in this disclosure are not necessarily to the same embodiment, and such references mean at least one.

Figure 1:
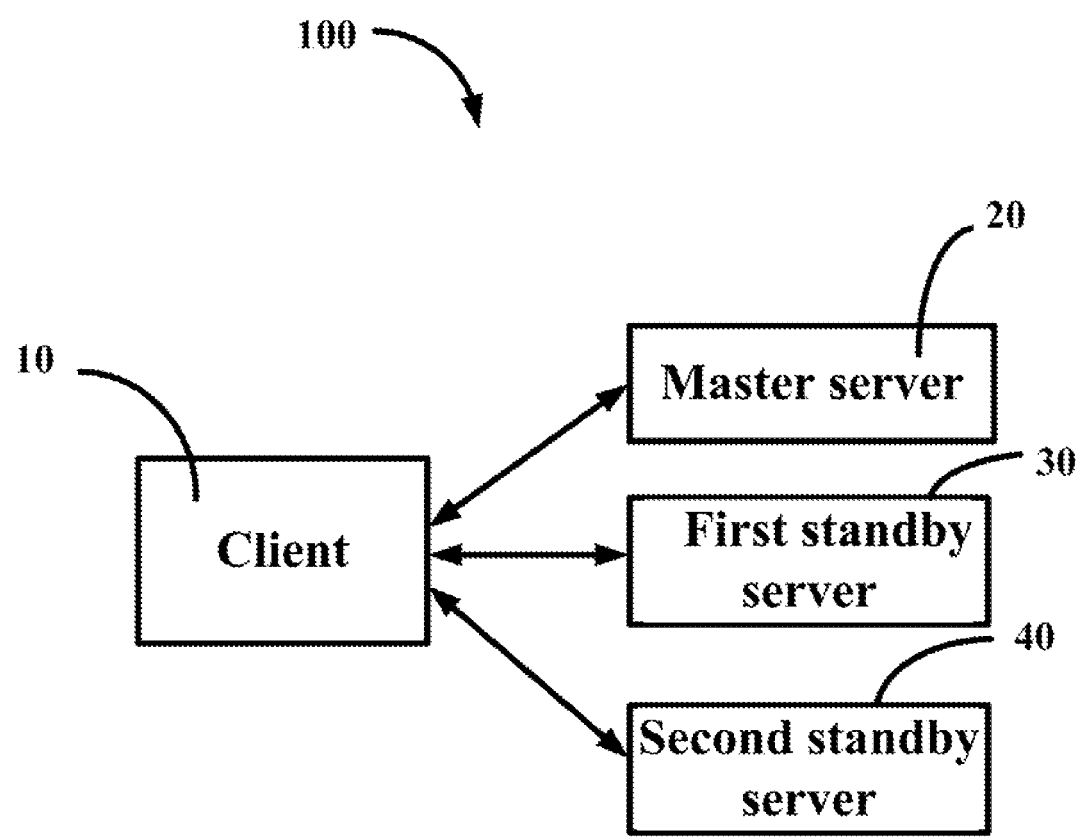
FIG. 1 is a schematic view showing a client-server system in accordance with an exemplary embodiment.

Referring to FIG. 1, a client-server system 100 includes a client 10, a master server 20, and at least one standby server 30. The client 10 can be connected to the master server 20 and to the at least one standby server 30. For simplicity, a first standby server 30 and a second standby server 40 are taken together as an example to illustrate the present disclosure.

Figure 2:
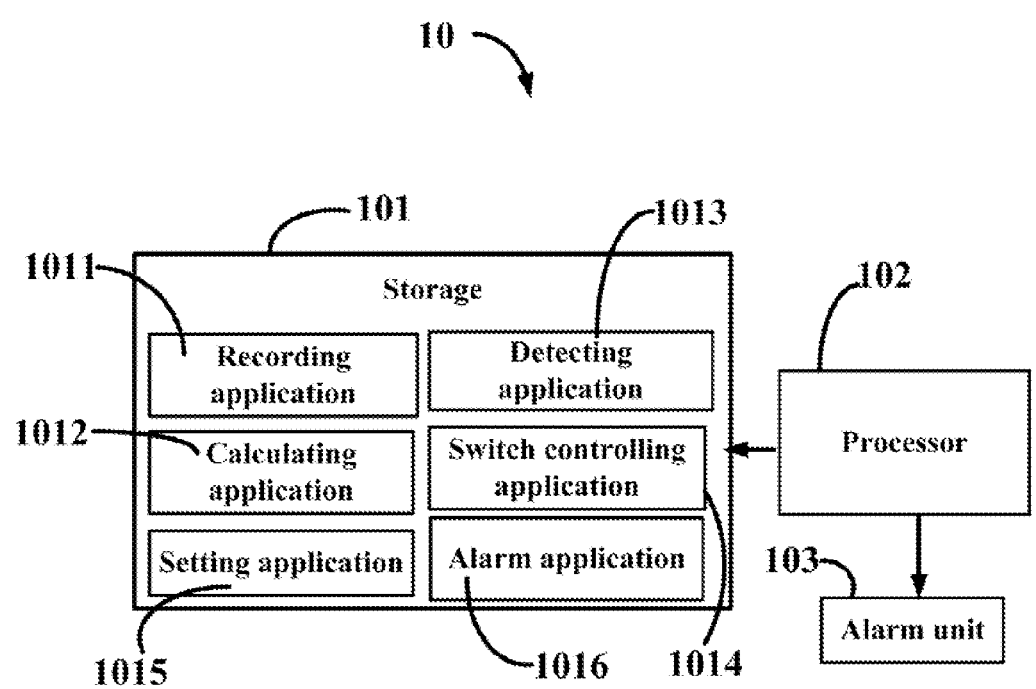
FIG. 2 is a block diagram of a client of FIG. 1 in accordance with an exemplary embodiment.

Referring to FIG. 2, the client 10 includes a storage 101 and a processor 102. The storage 101 stores connection data concerning connections between the client 10 and the master server 20, the standby servers 30, 40. The connection data for each server 20, 30, 40 may include an IP address of the server. The connection data for each server 20, 30, 40 may further include a login password required by the master server 20 and by the standby servers 30, 40 to determine whether the client 10 is authorized to connect.

The storage 101 further stores a recording application 1011, a calculating application 1012, a detecting application 1013, and a switch controlling application 1014. The processor 102 executes software in the storage 101 to command various functions in the client 10. The recording application 1011 includes software which may be implemented by the processor 102 to record the various amounts of time spent attempting a connection which resulted in a successful connection (connection setup time Tn), by the client 10 to the standby servers 30, 40 within a predetermined period such as a month. The calculating application 1012 includes software which may be implemented by the processor 102 to determine the overall average connection setup time T of the individual connection setup times Tn in relation to each standby server 30, 40 respectively, according to a predetermined calculation formula. In this embodiment, the predetermined calculation formula calculates the arithmetic mean values of all the recorded individual connection setup times Tn in relation to the standby servers 30, 40. The calculation formula is $T=(T1+T2+\ldots+Tn)/n$. For example, if T1, T2, and Tn are respectively 50 seconds, 45 seconds, and 55 seconds, then the average connection setup time T is $(50+45+55)/3$. In this embodiment, the storage 10 further includes a setting application 1015. The setting application 1015 includes software which may be implemented by the processor 102 to set an initial duration of time allowed for the client 10 to attempt to connect itself to each standby server 30, 40 in turn respectively at a first time.

The detecting application 1013 includes software which may be implemented by the processor 102 to detect in real time the connection status by the client 10 to the master server 20. The switch controlling application 1014 includes software which may be implemented by the processor 102 to switch the connection attempts of the client 10 away from the master server 20 towards one of the standby servers 30, 40, connecting to the standby servers 30, 40 in turn, according to the average connection setup time T applying to the standby servers 30, 40 respectively, once the client 10 has lost its connection with the master server 20. In this embodiment, when the client 10 loses its connection with the master server 20, the client 10 first attempts to connect to the standby server 30. If the client 10 is not successfully connected to the standby server 30 within the average connection setup time T applying to the server 30, the client 10 then attempts to connect itself to the standby server 40 within the average connection setup time T applying to the server 40.

In this embodiment, the client 10 further includes an alarm unit 103 and the storage unit 10 further includes an alarm application 1016. The alarm application 1016 includes software which may be implemented by the processor 102 to control the alarm unit 103 to warn a user of a failure connection.

Figure 3:
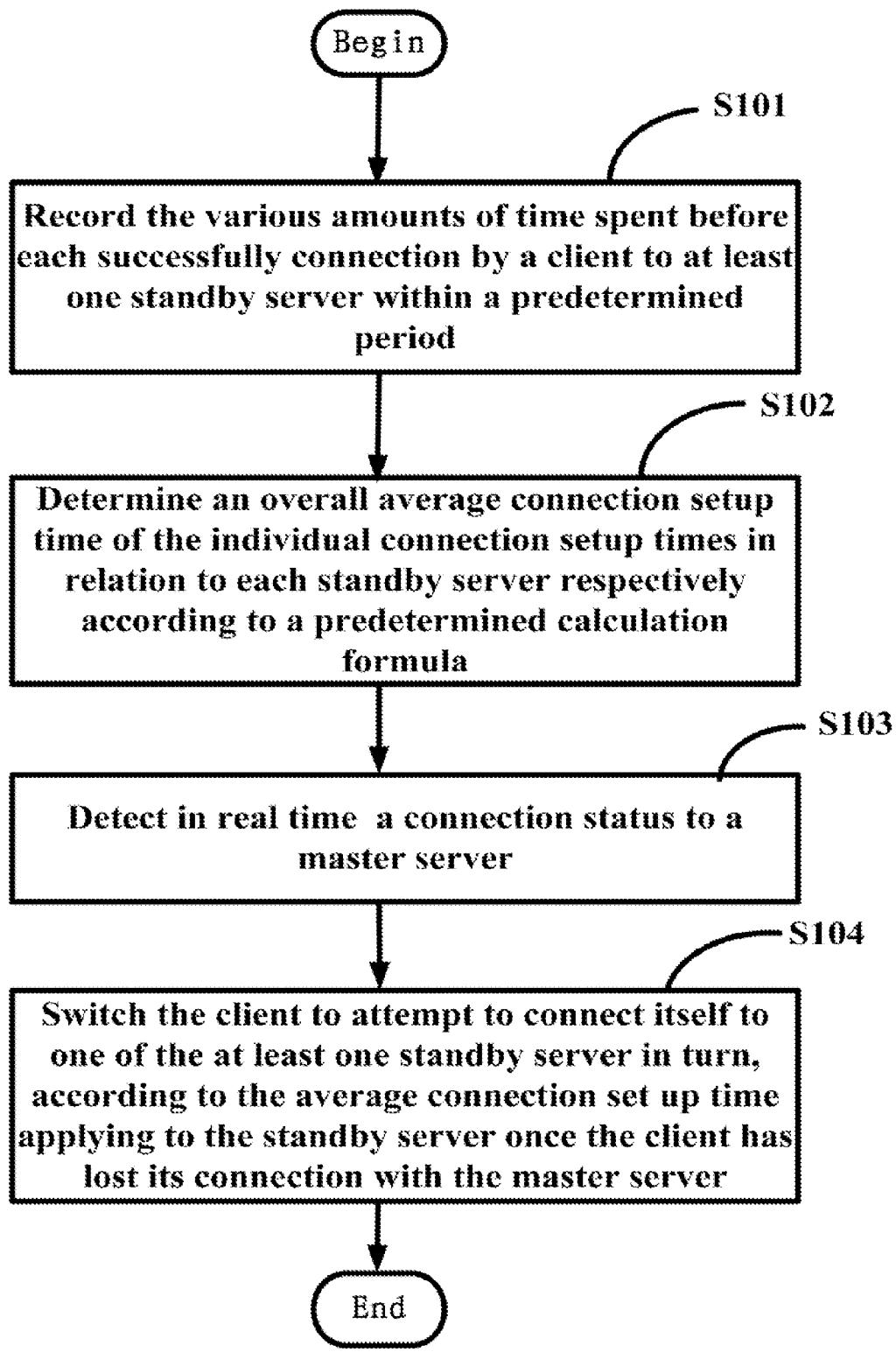
FIG. 3 is a flowchart of a method capable of controlling the duration time within which a client may attempt to connect itself to a standby server in accordance with an exemplary embodiment.

Referring to FIG. 3, a flowchart of a method capable of controlling the duration time within which a client may attempt to connect itself to a standby server is illustrated.

In step S101, the recording application 1011 is implemented by the processor 102 to record the various amounts of time spent before each successfully connection (connection setup time Tn), by the client 10 to the standby servers 30, 40 within a predetermined period.

In step S102, the calculating application 1012 is implemented by the processor 102 to determine the overall average connection setup time T of the individual connection setup times Tn in relation to each standby server respectively, according to a predetermined calculation formula.

In step S103, the detecting application 1013 is implemented by the processor 102 to detect in real time a connection status to the master server 20.

In step S104, the switch controlling application 1014 is implemented by the processor 102 to switch the connection attempts of the client 10 away from the master server 20 towards the standby servers 30, 40, connecting to one of the standby servers 30, 40 in turn, according to the average connection setup time T applying to the standby servers 30, 40 respectively, once the client 10 has lost its connection with the master server 20 as detected in step 103.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A client capable of controlling time of attempting to connect itself to a standby server, comprising:
   a storage storing a plurality of applications; and
   a processor to execute the plurality of applications,
      wherein the plurality of applications comprises instructions executable by the processor to:
         record various amounts of time before each successfully connection by the client to at least two standby servers respectively within a predetermined period;
         determine the overall average connection setup time of the individual connection setup times in relation to each of the at least two standby servers respectively according to a predetermined calculation formula;
         detect in real time a connection status to a master server; and
         switch the connection attempts of the client away to one of the at least two standby servers in turn, according to the average connection setup time applying to each of the at least two standby servers respectively, once the client has lost its connection with the master server.

2. The client as described in claim 1, wherein the calculation formula calculates the arithmetic mean values of all the recorded individual connection setup times in relation to each of the at least two standby servers.

3. The client as described in claim 1, wherein the plurality of applications further comprises instructions executable by the processor to set an initial duration of time allowed for the client to attempt to connect itself to each of the at least two standby servers in turn respectively at a first time.

4. The client as described in claim 1, wherein the storage stores connection data concerning connections between the client and the at least two standby servers.

5. The client as described in claim 4, wherein the connection data comprises IP address of each of the at least two standby servers.

6. The client as described in claim 5, wherein the connection data for each of the at least two standby servers further comprises a login password respectively required by each of the at least two standby servers to determine whether the client is authorized to connect.

7. The client as described in claim 1 further comprising an alarm unit, wherein the plurality of applications further comprises instructions executable by the processor to control the alarm unit to warn a user of a failure connection.

8. A switching method capable of controlling the duration time within which a client may attempt to connect itself to a standby server, comprising:
   recording various amounts of time before each successfully connection by the client to at least two standby servers, respectively within a predetermined period;
   determining the overall average connection setup time of the individual connection setup times in relation to each of the at least two standby servers respectively according to a predetermined calculation formula;
   detecting in real time a connection status to a master server; and
   switching the connection attempts of the client away to one of the at least two standby servers in turn, according to the average connection setup time applying to the one of the at least two standby servers, once the client has lost its connection with the master server.

9. The switching method as described in claim 8, wherein the calculation formula calculates the arithmetic mean values of all the recorded individual connection setup times in relation to each of the at least two standby servers.

* * * * *